United States Patent
Qin et al.

(10) Patent No.: US 11,254,304 B2
(45) Date of Patent: Feb. 22, 2022

(54) CONTROL METHOD AND APPARATUS FOR AUTONOMOUS VEHICLE, COMPUTER DEVICE, AND STORAGE MEDIUM

(71) Applicant: BAIDU ONLINE NETWORK TECHNOLOGY (BEIJING) CO., LTD., Beijing (CN)

(72) Inventors: Wenchuang Qin, Beijing (CN); Xiapeng Peng, Beijing (CN); Jiayong Huang, Beijing (CN); Ke Tang, Beijing (CN); Qiyang Shao, Beijing (CN); Xuguang Lv, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 46 days.

(21) Appl. No.: 16/830,549

(22) Filed: Mar. 26, 2020

(65) Prior Publication Data

US 2020/0391726 A1 Dec. 17, 2020

(30) Foreign Application Priority Data

Jun. 14, 2019 (CN) .......................... 201910515869.2

(51) Int. Cl.
*B60W 30/045* (2012.01)
*B60W 40/114* (2012.01)
(Continued)

(52) U.S. Cl.
CPC ........ *B60W 30/045* (2013.01); *B60W 40/114* (2013.01); *B60W 50/0098* (2013.01); *B60W 50/085* (2013.01)

(58) Field of Classification Search
CPC ............. B60W 30/045; B60W 40/114; B60W 50/0098; B60W 50/085; B60W 10/20;
(Continued)

(56) References Cited

U.S. PATENT DOCUMENTS 5,642,281 A * 6/1997 Ishida ...................... B62D 6/00
                                                    180/410
5,732,369 A * 3/1998 Hirano ..................... B62D 6/00
                                                    180/410
(Continued)

FOREIGN PATENT DOCUMENTS

CN    104773170 A    7/2015
CN    105416276 A    3/2016
(Continued)

OTHER PUBLICATIONS

European Patent Application No. 20164761.7 extended Search and Opinion dated Sep. 29, 2020, 9 pages.
(Continued)

*Primary Examiner* — Jeff A Burke
*Assistant Examiner* — Kyle T Johnson
(74) *Attorney, Agent, or Firm* — Lathrop GPM LLP

(57) ABSTRACT

The present disclosure provides a control method and apparatus for an autonomous vehicle, a computer device and a storage medium. The current steering wheel angle, vehicle speed and yaw rate are obtained, the current steering wheel angle is corrected based on the first correction deviation coefficient and the second correction deviation coefficient of the previous cycle, the corrected steering wheel angle and the current vehicle speed are input into the preset vehicle dynamic model to obtain the estimated yaw rate, the first yaw rate deviation value between the current yaw rate and the estimated yaw rate is obtained, and processed by the preset closed-loop algorithm to obtain the first correction deviation coefficient and the second correction deviation coefficient of the current cycle, and the target steering wheel angle is corrected, and the vehicle is driven based on the corrected target steering wheel angle.

18 Claims, 5 Drawing Sheets

(51) Int. Cl.
  *B60W 50/00* (2006.01)
  *B60W 50/08* (2020.01)
(58) Field of Classification Search
  CPC .... B60W 30/18; B60W 40/105; B60W 40/10; B60W 40/00; B62D 15/025; B62D 6/003
  See application file for complete search history.

(56) References Cited

U.S. PATENT DOCUMENTS

| | | | | |
|---|---|---|---|---|
| 5,742,917 | A * | 4/1998 | Matsuno | B60K 17/3462 701/69 |
| 5,805,449 | A * | 9/1998 | Ito | B60W 30/18145 701/41 |
| 6,256,561 | B1 * | 7/2001 | Asanuma | B62D 1/286 180/197 |
| 6,338,022 | B1 * | 1/2002 | Shinmura | B62D 6/003 701/301 |
| 2008/0262692 | A1 | 10/2008 | Kogure et al. | |
| 2010/0256887 | A1 * | 10/2010 | Linda | B60T 8/1755 701/82 |
| 2010/0324766 | A1 * | 12/2010 | Linda | B60W 40/076 701/22 |
| 2011/0218706 | A1 * | 9/2011 | Mori | B60W 30/025 701/36 |
| 2012/0109412 | A1 * | 5/2012 | Hanzawa | B60W 30/02 701/1 |
| 2012/0173040 | A1 * | 7/2012 | Yokota | B60W 40/11 701/1 |
| 2012/0323458 | A1 * | 12/2012 | Futamura | B60T 8/1755 701/72 |
| 2017/0158238 | A1 * | 6/2017 | Takaso | B62D 15/026 |
| 2017/0217477 | A1 * | 8/2017 | Akatsuka | B62D 5/0463 |
| 2018/0022383 | A1 * | 1/2018 | Kunihiro | B62D 6/002 701/41 |
| 2019/0322313 | A1 * | 10/2019 | Munch | B62D 6/003 |
| 2020/0207412 | A1 * | 7/2020 | Al Assad | C09D 7/63 |
| 2020/0257291 | A1 * | 8/2020 | Zhang | B60W 50/00 |
| 2020/0391726 | A1 * | 12/2020 | Qin | B60W 50/0098 |

FOREIGN PATENT DOCUMENTS

| | | |
|---|---|---|
| CN | 106184199 A | 12/2016 |
| CN | 108482379 A | 9/2018 |
| CN | 109291932 A | 2/2019 |
| DE | 102014209526 A1 | 11/2015 |
| EP | 3459820 A1 | 3/2019 |
| JP | 2017089465 A | 5/2017 |

OTHER PUBLICATIONS

Chinese Patent Application No. 201910515869.2 Office Action dated May 7, 2020, 6 pages.
Chinese Patent Application No. 201910515869.2 English translation of Office Action dated May 7, 2020, 5 pages.

* cited by examiner

CONTROL METHOD AND APPARATUS FOR AUTONOMOUS VEHICLE, COMPUTER DEVICE, AND STORAGE MEDIUM

CROSS-REFERENCE TO RELATED APPLICATIONS

This application is based on and claims priority to Chinese Patent Application No. 201910515869.2, filed with the State Intellectual Property Office of P. R. China on Jun. 14, 2019, the entire contents of which are incorporated herein by reference.

TECHNICAL FIELD

The present disclosure relates to the field of autonomous driving technologies, and more particularly, to a control method for an autonomous vehicle, a control apparatus for an autonomous vehicle, a computer device and a storage medium.

BACKGROUND

Generally, in autonomous driving, it is necessary to convert a desired yaw rate into a steering wheel angle to control the vehicle, and make the yaw rate generated by the vehicle close to the desired yaw rate, thereby ensuring the accuracy of vehicle control.

SUMMARY

Embodiments of the present disclosure provide a control method for an autonomous vehicle, including: obtaining a current steering wheel angle, a current vehicle speed and a current yaw rate of the autonomous vehicle; correcting the current steering wheel angle based on a first correction deviation coefficient and a second correction deviation coefficient obtained in a previous cycle to generate a corrected steering wheel angle; inputting the corrected steering wheel angle and the current vehicle speed into a preset vehicle dynamic model to obtain an estimated yaw rate; obtaining a first yaw rate deviation value between the current yaw rate and the estimated yaw rate; processing the first yaw rate deviation value by a preset closed-loop algorithm to obtain a first correction deviation coefficient and a second correction deviation coefficient of a current cycle; and performing correction processing on a target steering wheel angle based on the first correction deviation coefficient and the second correction deviation coefficient of the current cycle to obtain a corrected target steering wheel angle, and controlling the autonomous vehicle to drive based on the corrected target steering wheel angle.

Embodiments of the present disclosure provide a computer device. The computer device includes a processor and a memory. The memory is configured to store executable program codes, the processor is configured to run a program corresponding to the executable program codes by reading the executable program codes stored in the memory, to perform the control method for an autonomous vehicle according to embodiments of the present disclosure.

Embodiments of the present disclosure provide a non-transitory computer readable storage medium having a computer program stored thereon. When the program is executed by a processor, the program causes the processor to implement the control method for an autonomous vehicle according to embodiments of the present disclosure.

Embodiments of the present disclosure provide a computer program product. When instructions stored in the computer program product are executed by a processor, the computer program product causes the control method for an autonomous vehicle according to embodiments of the present disclosure to be implemented.

Additional aspects and advantages of the present application will be given in the following description, some of which will become apparent from the following description or be learned from practices of the present application.

BRIEF DESCRIPTION OF THE DRAWINGS

The foregoing and/or additional aspects and advantages of the present disclosure are easily understood in descriptions of the embodiments with reference to the following accompanying drawings, in which.

DETAILED DESCRIPTION

Embodiments of the present disclosure are described below in detail, examples of the embodiments are shown in accompanying drawings, and reference signs that are the same or similar from beginning to end represent the same or similar components or components that have the same or similar functions. The embodiments described below with reference to the accompanying drawings are exemplary, are merely used to explain the present disclosure, and cannot be construed as a limit to the present disclosure.

In the related art, lateral dynamic modeling is performed to control the vehicle laterally based on the location of the mass center, tire data and steering ratio. However, the change in vehicle load will affect the location of the mass center, and characteristics of tires are different in different turning scenarios, and existing methods can only cover driving scenarios on flat roads, and cannot cover complex driving scenarios, resulting in inaccurate lateral control of the vehicle.

A control method for an autonomous vehicle, a control method apparatus for an autonomous vehicle, a computer device and a storage medium according to embodiments of the present disclosure are described with reference to the accompanying drawings.

Figure 1:
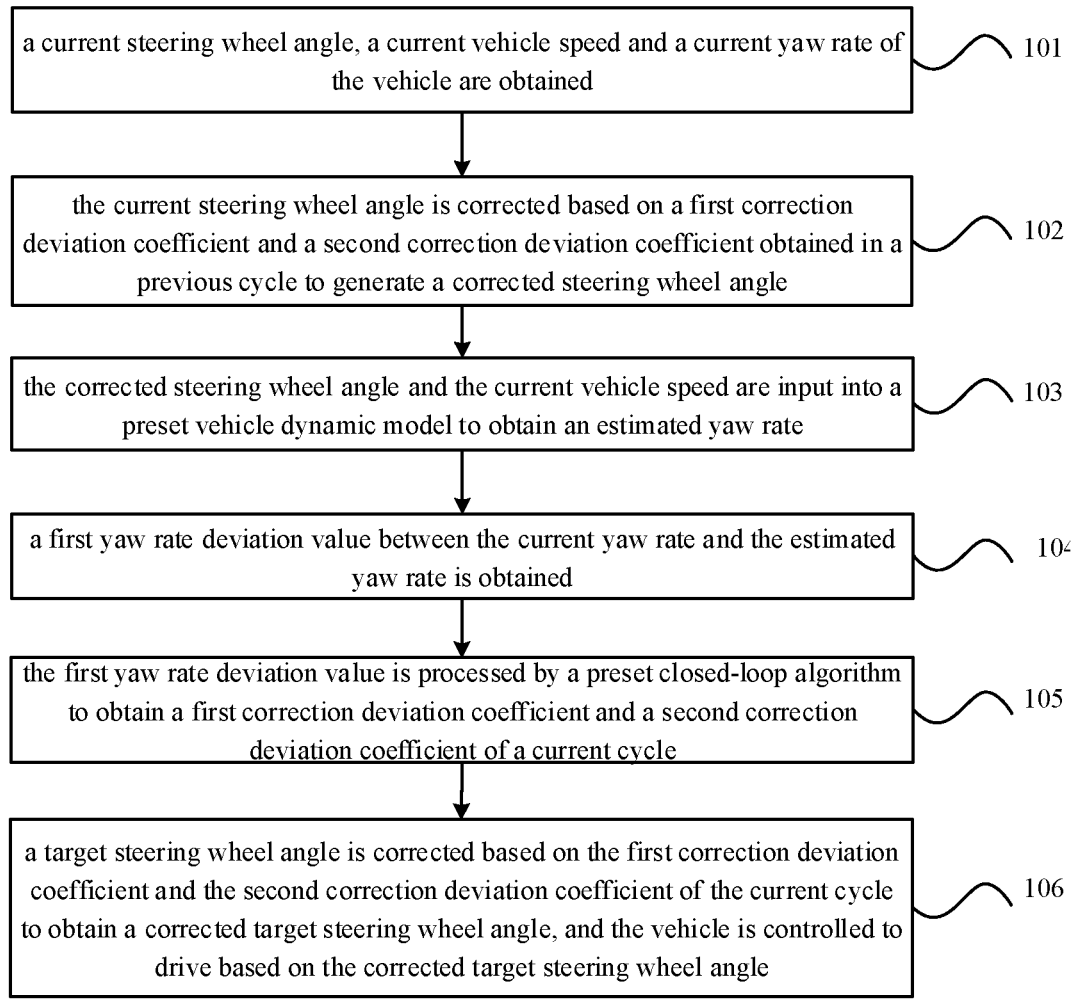
FIG. 1 is a flowchart of a control method for an autonomous vehicle according to some embodiments of the present disclosure.

FIG. 1 is a flowchart of a control method for an autonomous vehicle according to some embodiments of the present disclosure. As shown in FIG. 1, the control method for an autonomous vehicle includes the following acts.

At block 101, a current steering wheel angle, a current vehicle speed and a current yaw rate of the vehicle are obtained.

At block 102, the current steering wheel angle is corrected based on a first correction deviation coefficient and a second correction deviation coefficient obtained in a previous cycle to generate a corrected steering wheel angle.

At block 103, the corrected steering wheel angle and the current vehicle speed are input into a preset vehicle dynamic model to obtain an estimated yaw rate.

During driving of the autonomous vehicle, it is necessary to convert the desired yaw rate into the steering wheel angle to control the vehicle, and make the yaw rate generated by the vehicle close to the desired yaw rate, thereby ensuring the accuracy of vehicle control. However, in practical applications, the change in vehicle load will affect the location of the mass center, and characteristics of tires are different in different turning scenarios, and existing methods can only cover driving scenarios on flat roads, and cannot cover complex driving scenarios, resulting in insufficient lateral control of the vehicle. The present disclosure provides a control method for an autonomous vehicle, the current steering wheel angle and the target steering wheel angle are corrected in real time, the yaw rate generated by the vehicle is close to the desired yaw rate, such that the accuracy of lateral control of the vehicle can be improved.

Under the driving state of the vehicle, the steering wheel angle, the vehicle speed and yaw rate generated at the current time point are the current steering wheel angle, the current vehicle speed and the current yaw rate.

The control method for the autonomous vehicle according to the present disclosure can achieve real-time correction during the driving process of the vehicle. The first correction deviation coefficient and the second correction deviation coefficient acquired in the previous cycle are pre-stored, such that correction can be performed on the current steering wheel angle based on the pre-stored first correction deviation coefficient and the second correction deviation coefficient of the previous cycle to generate the corrected steering wheel angle.

There are many ways to correct the current steering wheel angle based on the first correction deviation coefficient and the second correction deviation coefficient of the previous cycle. In an example, the current steering wheel angle may be corrected based on the first correction deviation coefficient and the second correction deviation coefficient by a first formula, which may be expressed by:

$$\delta_{real2}=(\delta_{real1}-\text{biase})/\text{slope},$$

where $\delta_{real1}$ is the current steering wheel angle, $\delta_{real2}$ is the corrected steering wheel angle, slope is the first correction deviation coefficient of the previous cycle, and biase is the second correction deviation coefficient of the previous cycle.

Further, the corrected steering wheel angle and the current vehicle speed may be input into the preset vehicle dynamic model to obtain the estimated yaw rate. The preset vehicle dynamic model may be a pre-established vehicle dynamic model that can generate the estimated yaw rate corresponding to the current steering wheel angle and the current vehicle speed. The preset vehicle dynamic model may refer to inputting the vehicle speed and steering wheel angle, and outputting the yaw rate, which are the same as the data stream of the real vehicle.

At block 104, a first yaw rate deviation value between the current yaw rate and the estimated yaw rate is obtained.

At block 105, the first yaw rate deviation value is processed by a preset closed-loop algorithm to obtain a first correction deviation coefficient and a second correction deviation coefficient of a current cycle.

At block 106, a target steering wheel angle is corrected based on the first correction deviation coefficient and the second correction deviation coefficient of the current cycle to obtain a corrected target steering wheel angle, and the vehicle is controlled to drive based on the corrected target steering wheel angle.

It may be understood that, the estimated yaw rate obtained through the preset vehicle dynamic model may be the same or different from the current yaw rate. When the first yaw rate deviation value between the current yaw rate and the estimated yaw rate is obtained, it indicates that the target steering wheel angle needs to be corrected. Then, the first yaw rate deviation value between the current yaw rate and the estimated yaw rate is processed by a preset closed-loop algorithm to obtain the first correction deviation coefficient and the second correction deviation coefficient of the current cycle, and correction processing is performed on the target steering wheel angle based on the first correction deviation coefficient and the second correction deviation coefficient of the current cycle, such that the vehicle is driven based on the corrected target steering wheel angle. There are many types of the preset closed-loop algorithm, such as a PI (Proportional Integral) closed-loop algorithm, which may be selected according to actual application requirements.

The target steering wheel angle may be generated based on the desired yaw rate and the current yaw rate, and there are many ways to correct the target steering wheel angle based on the first correction deviation coefficient and the second correction deviation coefficient of the current cycle. In an example, the target steering wheel angle may be corrected based on the first correction deviation coefficient and the second correction deviation coefficient of the current cycle by second formula, which may be expressed by:

$$\delta_{cmd2}=\delta_{cmd1}+\text{biase})\times\text{slope},$$

where $\delta_{cmd1}$ is the target steering wheel angle, $\delta_{cmd2}$ is the target steering wheel angle obtained after the correction processing, slope is the first correction deviation coefficient of the current cycle, and biase is the second correction deviation coefficient of the current cycle.

With the control method for an autonomous vehicle according to embodiments of the present disclosure, the current steering wheel angle, the current vehicle speed and the current yaw rate of the vehicle are obtained, the current steering wheel angle is corrected based on the first correction deviation coefficient and the second correction deviation coefficient obtained in the previous cycle to generate the corrected steering wheel angle, the corrected steering wheel angle and the current vehicle speed are input into the preset vehicle dynamic model to obtain the estimated yaw rate, the first yaw rate deviation value between the current yaw rate and the estimated yaw rate is obtained, and the first yaw rate deviation value is processed by the preset closed-loop algorithm to obtain the first correction deviation coefficient and the second correction deviation coefficient of the current cycle, and the target steering wheel angle is corrected based on the first correction deviation coefficient and the second correction deviation coefficient of the current cycle to obtain the corrected target steering wheel angle, and the vehicle is controlled to drive based on the corrected target steering wheel angle, such that the technical problem of inaccurate lateral control of the vehicle can be solved. In addition, the current steering wheel angle and the target steering wheel angle are corrected in real time, such that the yaw rate generated by the vehicle can be close to the desired yaw rate, and the accuracy of lateral control of the vehicle can be improved.

Figure 2:
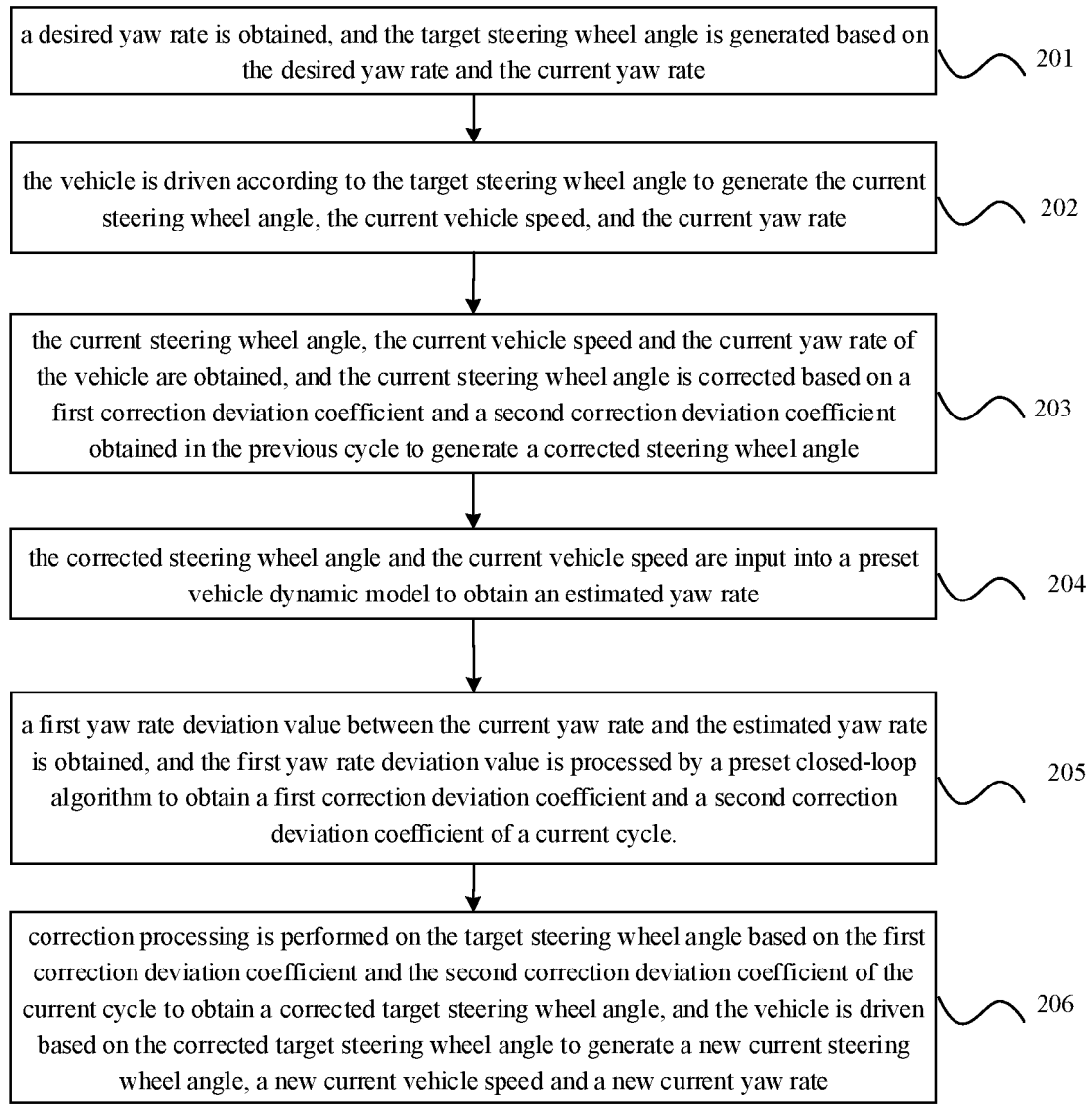
FIG. 2 is a flowchart of a control method for an autonomous vehicle according to some embodiments of the present disclosure.

FIG. 2 is a flowchart of a control method for an autonomous vehicle according to some embodiments of the present disclosure. As shown in FIG. 2, the control method for an autonomous vehicle may include the following acts.

At block 201, a desired yaw rate is obtained, and the target steering wheel angle is generated based on the desired yaw rate and the current yaw rate.

In an example, the desired yaw rate may refer to a yaw rate output by the vehicle under an ideal condition. Different desired yaw rates may be selected for different scenarios, and the target steering wheel angle may be generated based on the desired yaw rate and the current yaw rate.

When the target steering wheel angle is calculated by using the vehicle dynamic inverse model, there is also a correlation with a roll angle of the road surface, in order to eliminate the influence of the roll angle of the road surface, the target steering wheel angle needs to be corrected.

There are many ways to generate the target steering wheel angle based on the desired yaw rate and the current yaw rate. In an example, the desired yaw rate is transformed by a preset reference model to generate a reference yaw rate, a second yaw rate deviation value between the current yaw rate and the reference yaw rate is obtained, correction processing is performed on the desired yaw rate based on a preset model reference adaptive algorithm and the second yaw rate deviation value to obtain a target desired yaw rate, and the target desired yaw rate is input into the vehicle dynamic inverse model to obtain the target steering wheel angle.

In order to eliminate the influence of hardware characteristics, the desired yaw acceleration may be converted into the reference yaw rate (theoretically, a yaw rate that the vehicle should respond to) by the preset reference model.

In an example, the preset reference model may be expressed by:

$$G(s) = \frac{K\omega_n^2}{s^2 + 2\xi\omega_n s + \omega_n^2}.$$

where $\xi$ is the damping ratio, $\omega_n$ is the natural frequency, and K is the constant. The preset model reference adaptive algorithm may be used as a closed-loop algorithm to correct a tracking deviation. Based on characteristics of the vehicle, the damping ratio $\xi$ and the natural frequency $\omega_n$ are identified, the desired yaw rate is input to G(s) first to obtain the reference yaw rate, and the adaptive control algorithm is performed on the deviation between the reference yaw rate and the desired yaw rate to obtain the target desired yaw rate. By using the preset model reference adaptive algorithm to perform the close-loop operation on the desired yaw rate and the real yaw rate, the steady-state deviation can be eliminated, and adapting according to the characteristics of the steering wheel can be achieved.

The preset vehicle dynamic inverse model may refer to inputting the yaw rate and the vehicle speed, and outputting the steering wheel angle, which are opposite to the data stream of the real vehicle.

At block 202, the vehicle is driven according to the target steering wheel angle to generate the current steering wheel angle, the current vehicle speed, and the current yaw rate.

At block 203, the current steering wheel angle, the current vehicle speed and the current yaw rate of the vehicle are obtained, and the current steering wheel angle is corrected based on a first correction deviation coefficient and a second correction deviation coefficient obtained in the previous cycle to generate a corrected steering wheel angle.

At block 204, the corrected steering wheel angle and the current vehicle speed are input into a preset vehicle dynamic model to obtain an estimated yaw rate.

There are many ways to correct the current steering wheel angle based on the first correction deviation coefficient and the second correction deviation coefficient of the previous cycle to generate the corrected steering wheel angle. In an example, a first formula may be applied, to correct the current steering wheel angle based on the first correction deviation coefficient and the second correction deviation coefficient acquired in the previous cycle to generate the corrected steering wheel angle, the first formula may be expressed by:

$$\delta_{real2} = (\delta_{real1} - \text{biase})/\text{slope},$$

where $\delta_{real1}$ is the current steering wheel angle, $\delta_{real2}$ is the corrected steering wheel angle, slope is the first correction deviation coefficient of the previous cycle, and biase is the second correction deviation coefficient of the previous cycle.

Further, the corrected steering wheel angle and the current vehicle speed are input into the preset vehicle dynamic model to obtain the estimated yaw rate. The preset vehicle dynamic model may be a pre-established vehicle dynamic model that can generate the estimated yaw rate corresponding to the current steering wheel angle and the current vehicle speed.

At block 205, a first yaw rate deviation value between the current yaw rate and the estimated yaw rate is obtained, and the first yaw rate deviation value is processed by a preset closed-loop algorithm to obtain a first correction deviation coefficient and a second correction deviation coefficient of a current cycle.

At block 206, correction processing is performed on the target steering wheel angle based on the first correction deviation coefficient and the second correction deviation coefficient of the current cycle to obtain a corrected target steering wheel angle, and the vehicle is driven based on the corrected target steering wheel angle to generate a new current steering wheel angle, a new current vehicle speed and a new current yaw rate.

It may be understood that, the estimated yaw rate obtained through the preset vehicle dynamic model may be the same or different from the current yaw rate. When the first yaw rate deviation value between the current yaw rate and the estimated yaw rate is obtained, it indicates that the target steering wheel angle needs to be corrected. Thus, the first yaw rate deviation value between the current yaw rate and the estimated yaw rate is processed by the preset closed-loop algorithm to obtain the first correction deviation coefficient and the second correction deviation coefficient of the current cycle, and correction processing is performed on the target steering wheel angle based on the first correction deviation coefficient and the second correction deviation coefficient of the current cycle, such that the vehicle is driven based on the target steering wheel angle obtained after the correction process.

There are many types of the preset closed-loop algorithm, such as the PI closed-loop algorithm, which may be selected according to actual application requirements.

There are many ways to correct the target steering wheel angle based on the first correction deviation coefficient and the second correction deviation coefficient of the current cycle. In an example, a second formula may be applied, to correct the target steering wheel angle based on the first correction deviation coefficient and the second correction deviation coefficient of the current cycle, the second formula may be expressed by:

$$\delta_{cmd2}=\delta_{cmd1}+\text{biase})\times\text{slope},$$

where $\delta_{cmd1}$ is the target steering wheel angle, $\delta_{cmd2}$ is the target steering wheel angle obtained after the correction processing, slope is the first correction deviation coefficient of the current cycle, and biase is the second correction deviation coefficient of the current cycle.

By adding an on-line dynamic parameter correction module, the dynamic parameters are corrected in real time to improve the conversion accuracy of the target yaw rate to the target steering wheel angle. In addition, by using the preset model reference adaptive algorithm to perform the close-loop operation on the desired yaw rate and the real yaw rate, the steady-state deviation can be eliminated, and adapting according to the characteristics of the steering wheel can be achieved.

For example, the lateral dynamic parameters of the vehicle include a sprung mass M, a distance $l_f$ from the mass center to the front axle, a lateral stiffness $c_{af}$ of the left front wheel, a distance $l_r$ from the mass center to the rear wheel, a lateral stiffness $c_{ar}$, of the left rear wheel, and a wheelbase L. The vehicle speed V, the steering wheel angle δ, and the yaw rate $\dot{\varphi}$ of the vehicle may be collected on high-speed and urban roads, the scenes of the collected data cover as large a steering wheel angle as possible, and the collected speed V and yaw rate $\dot{\varphi}$ may be input to the preset vehicle dynamic model:

$$\frac{\delta_{est}}{\dot{\varphi}} = \frac{L}{V} + \frac{MV(l_r c_{ar} - l_f c_{af})}{2c_{af}c_{ar}}.$$

Thus, the steering wheel angle $\delta_{est}$ output from the preset vehicle dynamic model can be obtained, $\delta_{est}$ may be compared with the collected steering wheel angle, such that accurate dynamic parameters can be estimated based on the yaw rate deviation between $\delta_{est}$ and the collected steering wheel angle.

Figure 3:
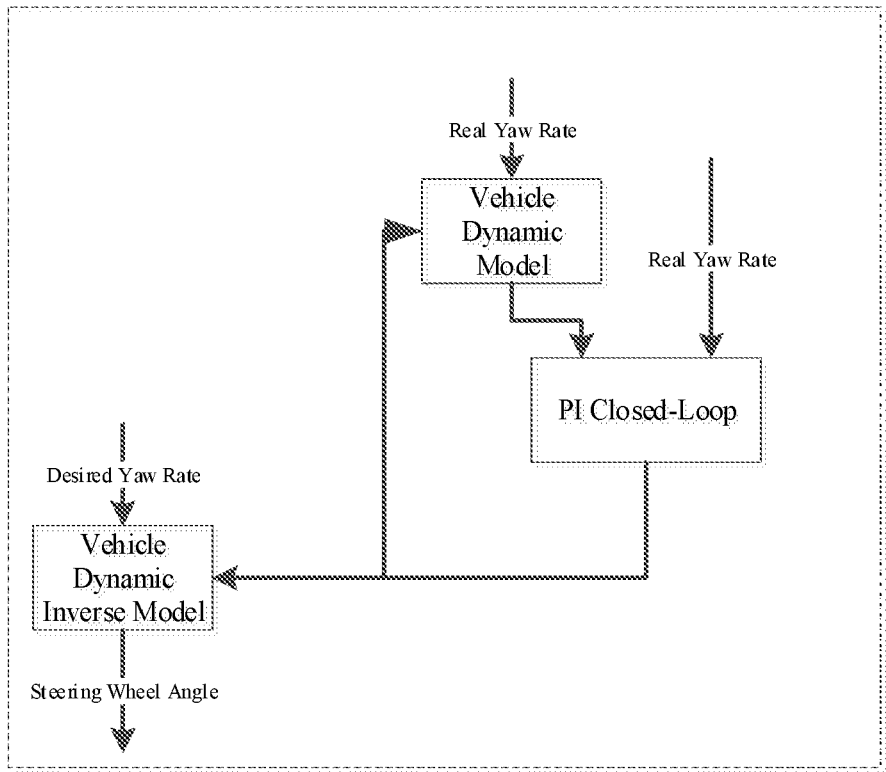
FIG. 3 is a schematic diagram of a control method for an autonomous vehicle according to some embodiments of the present disclosure.

As shown in FIG. 3, the estimated yaw rate $\dot{\varphi}_{est}$ is obtained according to the real steering wheel angle $\dot{\varphi}_{real}$ (i.e., the current yaw rate of the vehicle), the PI closed-loop algorithm is added to the estimated yaw rate $\dot{\varphi}_{est}$ and the real yaw rate $\dot{\varphi}_{real}$, and the following vehicle dynamic model are corrected online:

$$\text{slope}=I_{slope}(\dot{\varphi}_{real})*\int(\dot{\varphi}_{est}-\dot{\varphi}_{real})dt,$$

$$\text{biase}=I_{biase}(\dot{\varphi}_{real})*\int(\dot{\varphi}_{est}-\dot{\varphi}_{real})dt,$$

$$\delta_{real}=(\delta_{real}-\text{biase})/\text{slope},$$

$$\delta_{cmd}=(\delta_{cmd}+\text{biase})\times\text{slope},$$

where $I_{slope}(\dot{\varphi}_{real})$ represents that $I_{slope}$ is a function of $\dot{\varphi}_{real}$.

In addition, considering that the estimation of the yaw rate is not only related to vehicle dynamics, and also related to the road inclination and characteristics of the steering wheel, there may be a deviation between $\dot{\varphi}_{cmd}$ and $\dot{\varphi}_{real}$ By selecting the model reference adaptive control algorithm, the response characteristics of the steering wheel can be adapted and the steady-state deviation can be corrected.

For the response adaptation of the steering wheel, a second-order model $$G(s) = \frac{K\omega_n^2}{s^2 + 2\xi\omega_n s + \omega_n^2}$$

may be selected as the reference model ξ and $\omega_n$ may be adjusted according to the response characteristics of the steering wheel. The reference yaw rate $\dot{\varphi}_{ref}$ may be obtained by the second-order system model based on the desired yaw rate $\dot{\varphi}_{cmd}$, and the target steering wheel angle is obtained by the model reference adaptive algorithm and based on the deviation between $\dot{\varphi}_{ref}$ and $\dot{\varphi}_{cmd}$.

With the control method for an autonomous vehicle according to embodiments of the present disclosure, the current steering wheel angle, the current vehicle speed and the current yaw rate of the vehicle are obtained, the current steering wheel angle is corrected based on the first correction deviation coefficient and the second correction deviation coefficient obtained in the previous cycle to generate the corrected steering wheel angle, the corrected steering wheel angle and the current vehicle speed are input into the preset vehicle dynamic model to obtain the estimated yaw rate, the first yaw rate deviation value between the current yaw rate and the estimated yaw rate is obtained, and the first yaw rate deviation value is processed by the preset closed-loop algorithm to obtain the first correction deviation coefficient and the second correction deviation coefficient of the current cycle, and the target steering wheel angle is corrected based on the first correction deviation coefficient and the second correction deviation coefficient of the current cycle to obtain the corrected target steering wheel angle, and the vehicle is controlled to drive based on the corrected target steering wheel angle, such that the technical problem of inaccurate lateral control of the vehicle can be solved. In addition, the current steering wheel angle and the target steering wheel angle are corrected in real time, such that the yaw rate generated by the vehicle can be close to the desired yaw rate, and the accuracy of lateral control of the vehicle can be improved.

Figure 4:
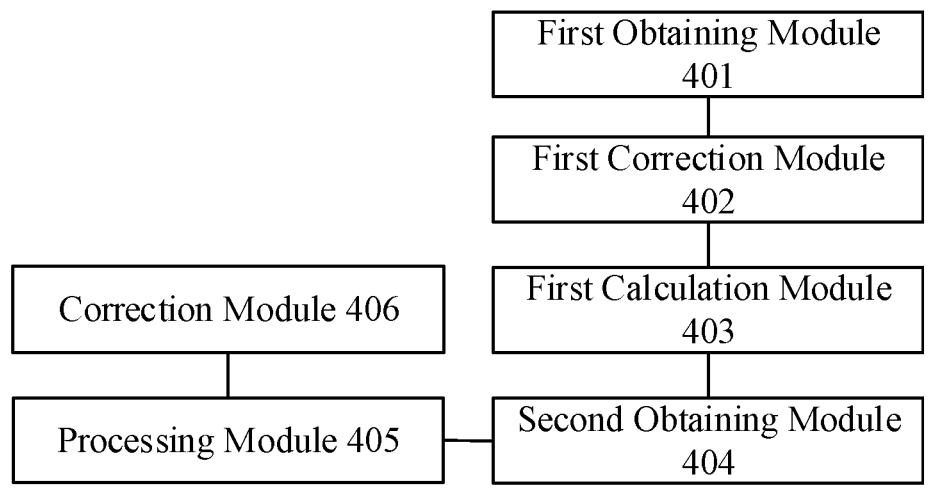
FIG. 4 is a schematic diagram of a control apparatus for an autonomous driving vehicle according to some embodiments of the present disclosure.

Embodiments of the present disclosure further provide a control apparatus for an autonomous vehicle. FIG. 4 is a schematic diagram of a control apparatus for an autonomous driving vehicle according to some embodiments of the present disclosure.

As shown in FIG. 4, the control apparatus may include a first obtaining module 401, a first correction module 402, a first calculation module 403, a second obtaining module 404, a processing module 405 and a correction module 406.

The first obtaining module 401 is configured to obtain the current steering wheel angle, the current vehicle speed and the current yaw rate of the vehicle.

The first correction module 402 is configured to correct the current steering wheel angle based on the first correction deviation coefficient and the second correction deviation coefficient obtained in the previous cycle to generate the corrected steering wheel angle.

The first calculation module 403 is configured to input the corrected steering wheel angle and the current vehicle speed into the preset vehicle dynamic model to obtain the estimated yaw rate.

The second obtaining module 404 is configured to obtain a first yaw rate deviation value between the current yaw rate and the estimated yaw rate.

The processing module 405 is configured to process the first yaw rate deviation value by a preset closed-loop algorithm to obtain a first correction deviation coefficient and a second correction deviation coefficient of the current cycle.

The correction module 406 is configured to perform correction processing on the target steering wheel angle based on the first correction deviation coefficient and the second correction deviation coefficient of the current cycle to obtain a corrected target steering wheel angle, and control the vehicle to drive based on the corrected target steering wheel angle.

Figure 5:
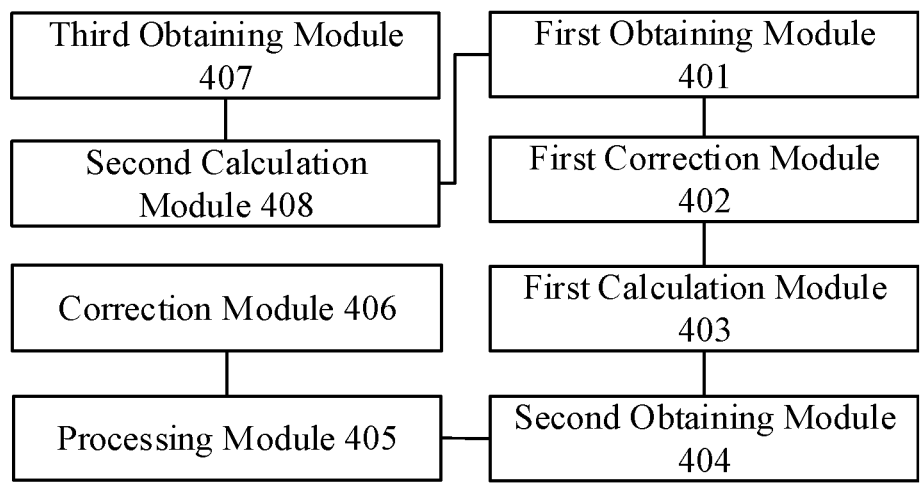
FIG. 5 is a schematic diagram of a control apparatus for an autonomous driving vehicle according to some other embodiments of the present disclosure.

FIG. 5 is a schematic diagram of a control apparatus for an autonomous driving vehicle according to some other embodiments of the present disclosure. As shown in FIG. 5, and on the basis of FIG. 4, the control apparatus further includes a third obtaining module 407 and a second calculation module 408.

The third obtaining module 407 is configured to obtain a desired yaw rate.

The second calculation module 408 is configured to generate the target steering wheel angle based on the desired yaw rate and the current yaw rate.

Figure 6:
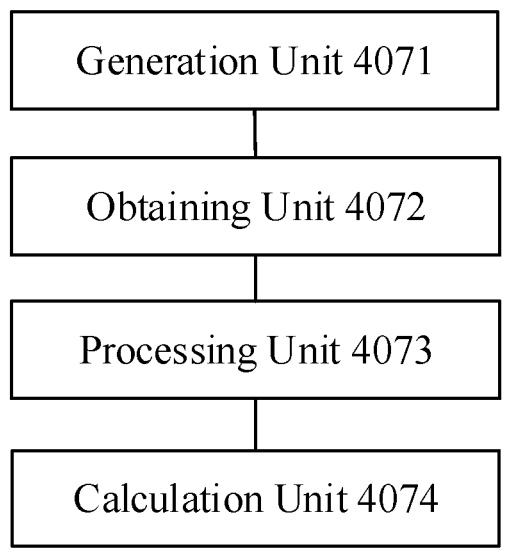
FIG. 6 is a schematic diagram of a second calculation module according to some embodiments of the present disclosure.

FIG. 6 is a schematic diagram of a second calculation module according to some embodiments of the present disclosure, as shown in FIG. 6, the second calculation module 408 includes a generation unit 4071, an obtaining unit 4072, a processing unit 4073 and a calculation unit 4074.

The generation unit 4071 is configured to transform the desired yaw rate by a preset reference model to generate a reference yaw rate.

The obtaining unit 4072 is configured to obtain a second yaw rate deviation value between the current yaw rate and the reference yaw rate.

The processing unit 4073 is configured to perform the correction processing on the desired yaw rate based on preset model reference adaptive algorithm and the second yaw rate deviation value to obtain a target desired yaw rate.

The calculation unit 4074 is configured to input the target desired yaw rate into a vehicle dynamic inverse model to obtain the target steering wheel angle.

In an example, the first correction module 402 is configured to correct the current steering wheel angle, by using a first formula, based on the first correction deviation coefficient and the second correction deviation coefficient obtained in the previous cycle to generate the corrected steering wheel angle. In an example, the first formula is expressed by:

$$\delta_{real2}=(\delta_{real1}-\text{biase})/\text{slope};$$

where $\delta_{real1}$ is the current steering wheel angle, $\delta_{real2}$ is the corrected steering wheel angle, slope is the first correction deviation coefficient of the previous cycle, and biase is the second correction deviation coefficient of the previous cycle.

In an example, the second correction module 406 is configured to correct the target steering wheel angle, by using a second formula, based on the first correction deviation coefficient and the second correction deviation coefficient of the current cycle to obtain the corrected target steering wheel angle. In example, the second formula is expressed by:

$$\delta_{cmd2}=(\delta_{cmd1}+\text{biase})\times\text{slope};$$

where $\delta_{cmd1}$ is the target steering wheel angle, $\delta_{cmd2}$ is the target steering wheel angle obtained after the correction processing, slope is the first correction deviation coefficient of the current cycle, and biase is the second correction deviation coefficient of the current cycle.

It should be noted that, the explanation of the control method for an autonomous vehicle according to the foregoing embodiments is also applicable to the control apparatus for an autonomous vehicle according to this embodiment. The implementation principles of the control method and the control apparatus are similar, and thus will not be repeated here.

With the control apparatus for an autonomous vehicle according to embodiments of the present disclosure, the current steering wheel angle, the current vehicle speed and the current yaw rate of the vehicle are obtained, the current steering wheel angle is corrected based on the first correction deviation coefficient and the second correction deviation coefficient obtained in the previous cycle to generate the corrected steering wheel angle, the corrected steering wheel angle and the current vehicle speed are input into the preset vehicle dynamic model to obtain the estimated yaw rate, the first yaw rate deviation value between the current yaw rate and the estimated yaw rate is obtained, and the first yaw rate deviation value is processed by the preset closed-loop algorithm to obtain the first correction deviation coefficient and the second correction deviation coefficient of the current cycle, and the target steering wheel angle is corrected based on the first correction deviation coefficient and the second correction deviation coefficient of the current cycle to obtain the corrected target steering wheel angle, and the vehicle is controlled to drive based on the corrected target steering wheel angle, such that the technical problem of inaccurate lateral control of the vehicle can be solved. In addition, the current steering wheel angle and the target steering wheel angle are corrected in real time, such that the yaw rate generated by the vehicle can be close to the desired yaw rate, and the accuracy of lateral control of the vehicle can be improved.

To realize the above embodiments, the present disclosure further provides a computer device. The computer device includes a processor and a memory. The memory is configured to store executable program codes, the processor is configured to run a program corresponding to the executable program codes by reading the executable program codes stored in the memory, to perform the control method for an autonomous vehicle according to embodiments of the present disclosure.

Figure 7:
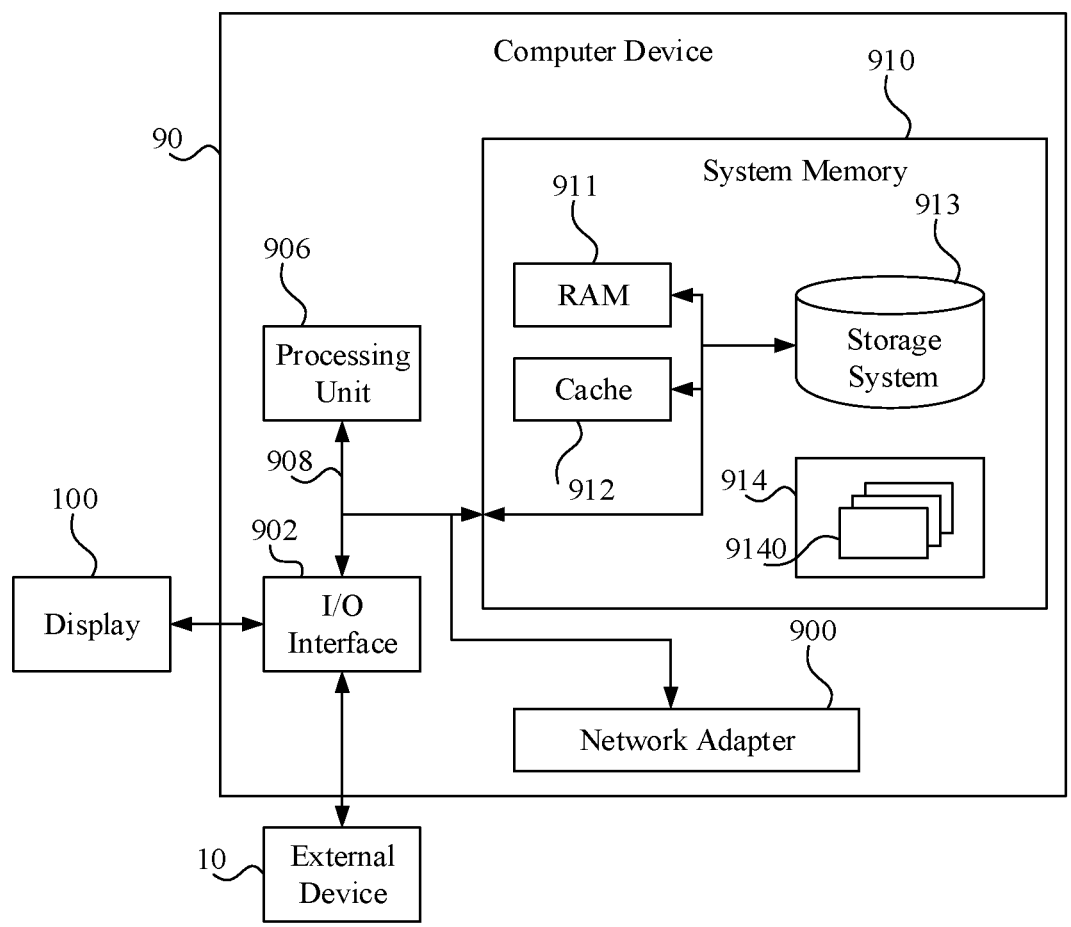
FIG. 7 is a schematic diagram of a computer device according to some embodiments of the present disclosure.

FIG. 7 is a schematic diagram of a computer device according to some embodiments of the present disclosure. The computer device 90 illustrated in FIG. 7 is only illustrated as an example, and should not be considered as any restriction on the function and the usage range of embodiments of the present disclosure.

As illustrated in FIG. 7, the computer device 90 is in the form of a general-purpose computing apparatus. The computer device 90 may include, but is not limited to, one or more processors or processing units 906, a system memory 910, and a bus 908 connecting different system components (including the system memory 910 and the processing unit 906).

The bus 908 represents one or more of several types of bus architectures, including a memory bus or a memory control bus, a peripheral bus, a graphic acceleration port (GAP) bus, a processor bus, or a local bus using any bus architecture in a variety of bus architectures. For example, these architectures include, but are not limited to, an industry standard architecture (ISA) bus, a micro-channel architecture (MCA) bus, an enhanced ISA bus, a video electronic standards association (VESA) local bus, and a peripheral component interconnect (PCI) bus.

Typically, the computer device 90 may include multiple kinds of computer-readable media. These media may be any storage media accessible by the computer device 90, including transitory or non-transitory storage medium and movable or unmovable storage medium.

The system memory 910 may include a computer-readable medium in a form of volatile memory, such as a random-access memory (RAM) 911 and/or a high-speed cache memory 912. The computer device 90 may further include other transitory/non-transitory storage media and movable/unmovable storage media. In way of example only, the storage system 913 may be used to read and write non-removable, non-volatile magnetic media (not shown in the figure, commonly referred to as "hard disk drives"). Although not illustrated in FIG. 7, it may be provided a disk driver for reading and writing movable non-volatile magnetic disks (e.g. "floppy disks"), as well as an optical driver for reading and writing movable non-volatile optical disks (e.g. a compact disc read only memory (CD-ROM, a digital video disc read only memory (DVD-ROM), or other optical media). In these cases, each driver may be connected to the bus 908 via one or more data medium interfaces. The system memory 910 may include at least one program product, which has a set of (for example at least one) program modules configured to perform the functions of embodiments of the present disclosure.

The computer readable signal medium may include a data signal propagating in baseband or as part of carrier which carries a computer readable program code. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object-oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server.

A program/application 914 with a set of (at least one) program modules 9140 may be stored in system memory 910, the program modules 9140 may include, but not limit to, an operating system, one or more application programs, other program modules and program data, and any one or combination of above examples may include an implementation in a network environment. The program modules 9140 are generally configured to implement functions and/or methods described in embodiments of the present disclosure.

The computer device 90 may also communicate with one or more external devices 10 (e.g., a keyboard, a pointing device, a display 100, and etc.) and may also communicate with one or more devices that enables a user to interact with the terminal device 90, and/or any device (e.g., a network card, a modem, and etc.) that enables the terminal device 90 to communicate with one or more other computing devices. This kind of communication can be achieved by the input/output (I/O) interface 902. In addition, the computer device 90 may be connected to and communicate with one or more networks such as a local area network (LAN), a wide area network (WAN) and/or a public network such as the Internet through a network adapter 900. As shown in FIG. 7, the network adapter 900 communicates with other modules of the computer device 90 over bus 908. It should be understood that although not shown in the figure, other hardware and/or software modules may be used in combination with the computer device 90, which including, but not limited to, microcode, device drivers, redundant processing units, external disk drive arrays, RAID systems, tape drives, as well as data backup storage systems and the like.

The processing unit 906 can perform various functional applications and control of an autonomous vehicle based on vehicle-mounted scenarios by running programs stored in the system memory 910, for example, to perform the control method for an autonomous vehicle according to embodiments of the present disclosure.

To achieve the above objectives, embodiments of the present disclosure further provide a non-transitory computer readable storage medium having a computer program stored thereon. When the program is executed by a processor, causes the processor to implement the control method for an autonomous vehicle according to embodiments of the present disclosure.

To achieve the above objectives, embodiments of the present disclosure further provide a computer program product. When instructions stored in the computer program product are executed by a processor, causes the control method for an autonomous vehicle according to embodiments of the present disclosure to be implemented.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. In addition, without conflicting, various embodiments or examples or features of various embodiments or examples described in the present specification may be combined by those skilled in the art.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A control method for an autonomous vehicle, comprising:
    obtaining a current steering wheel angle, a current vehicle speed and a current yaw rate of the autonomous vehicle;
    correcting the current steering wheel angle based on a first correction deviation coefficient and a second correction deviation coefficient obtained in a previous cycle to generate a corrected steering wheel angle;
    inputting the corrected steering wheel angle and the current vehicle speed into a preset vehicle dynamic model to obtain an estimated yaw rate;
    obtaining a first yaw rate deviation value between the current yaw rate and the estimated yaw rate;
    processing the first yaw rate deviation value by a preset closed-loop algorithm to obtain a first correction deviation coefficient and a second correction deviation coefficient of a current cycle; and
    performing correction processing on a target steering wheel angle based on the first correction deviation coefficient and the second correction deviation coefficient of the current cycle to obtain a corrected target steering wheel angle, and controlling the autonomous vehicle to drive based on the corrected target steering wheel angle.

2. The control method of claim 1, further comprising:
    selecting a desired yaw rate based on a scenario; and
    generating the target steering wheel angle based on the desired yaw rate and the current yaw rate.

3. The control method of claim 2, wherein generating the target steering wheel angle based on the desired yaw rate and the current yaw rate comprises:
    transforming the desired yaw rate by a preset reference model to generate a reference yaw rate;
    obtaining a second yaw rate deviation value between the current yaw rate and the reference yaw rate;
    performing correction processing on the desired yaw rate based on a preset model reference adaptive algorithm and the second yaw rate deviation value to obtain a target desired yaw rate; and
    inputting the target desired yaw rate into a vehicle dynamic inverse model to obtain the target steering wheel angle.

4. The control method of claim 1, wherein correcting the current steering wheel angle based on the first correction deviation coefficient and the second correction deviation coefficient obtained in the previous cycle to generate the corrected steering wheel angle comprises:
    correcting the current steering wheel angle, by using a first formula, based on the first correction deviation coefficient and the second correction deviation coefficient obtained in the previous cycle to generate the corrected steering wheel angle, wherein the first formula is expressed by:

$$\delta_{real2} = (\delta_{real1} - \text{bias}_{n-1})/\text{slope}_{n-1};$$

where $\delta_{real1}$ is the current steering wheel angle, $\delta_{real2}$ is the corrected steering wheel angle, $\text{slope}_{n-1}$ is the first correction deviation coefficient of the previous cycle, bias$_{n-1}$ is the second correction deviation coefficient of the previous cycle, and n−1 represents the previous cycle.

5. The control method of claim 1, wherein performing the correction processing on the target steering wheel angle based on the first correction deviation coefficient and the second correction deviation coefficient of the current cycle comprises:

correcting the target steering wheel angle, by using a second formula, based on the first correction deviation coefficient and the second correction deviation coefficient of the current cycle to obtain the corrected target steering wheel angle, wherein second formula is expressed by:

$$\delta_{cmd2}=(\delta_{cmd1}+\text{bias}_n)\times\text{slope}_n;$$

where $\delta_{cmd1}$ is the target steering wheel angle, $\delta_{cmd2}$ is the corrected target steering wheel angle, slope$_n$ is the first correction deviation coefficient of the current cycle, bias$_n$ is the second correction deviation coefficient of the current cycle, and n represents the current cycle.

6. The control method of claim 1, wherein the first correction deviation coefficient is expressed by:

$$\text{slope}=I_{slope}(\dot{\varphi}_{real})*\int(\dot{\varphi}_{est}-\dot{\varphi}_{real})dt; \text{ and}$$

the second correction deviation coefficient is expressed by:

$$\text{bias}=I_{bias}(\dot{\varphi}_{real})*\int(\dot{\varphi}_{est}-\dot{\varphi}_{real})dt,$$

where $\dot{\varphi}_{est}$ represents the estimated yaw rate, $\dot{\varphi}_{real}$ represents the current yaw rate, $I_{slope}(\dot{\varphi}_{real})$ represents that $\dot{\varphi}_{slope}$ is a function of $\dot{\varphi}_{reql}$, and $I_{bias}(\dot{\varphi}_{real})$ represents that bias is a function of $\dot{\varphi}_{real}$.

7. A control apparatus for an autonomous vehicle, comprising:

a processor; and a memory, configured to store executable program codes;

wherein the processor is configured to run a program corresponding to the executable program codes by reading the executable program codes stored in the memory, to:

obtain a current steering wheel angle, a current vehicle speed and a current yaw rate of a vehicle;

correct the current steering wheel angle based on a first correction deviation coefficient and a second correction deviation coefficient obtained in a previous cycle to generate a corrected steering wheel angle;

input the corrected steering wheel angle and the current vehicle speed into a preset vehicle dynamic model to obtain an estimated yaw rate;

obtain a first yaw rate deviation value between the current yaw rate and the estimated yaw rate;

process the first yaw rate deviation value by a preset closed-loop algorithm to obtain a first correction deviation coefficient and a second correction deviation coefficient of a current cycle; and perform correction processing on a target steering wheel angle based on the first correction deviation coefficient and the second correction deviation coefficient of the current cycle to obtain a corrected target steering wheel angle, and control the autonomous vehicle to drive based on the corrected target steering wheel angle.

8. The control apparatus of claim 7, wherein the processor is further configured to run a program corresponding to the executable program codes by reading the executable program codes stored in the memory, to:

select a desired yaw rate based on a scenario; and generate the target steering wheel angle based on the desired yaw rate and the current yaw rate.

9. The control apparatus of claim 8, wherein the processor is configured to run a program corresponding to the executable program codes by reading the executable program codes stored in the memory, to:

transform the desired yaw rate by a preset reference model to generate a reference yaw rate;

obtain a second yaw rate deviation value between the current yaw rate and the reference yaw rate;

perform correction processing on the desired yaw rate based on a preset model reference adaptive algorithm and the second yaw rate deviation value to obtain a target desired yaw rate; and input the target desired yaw rate into a vehicle dynamic inverse model to obtain the target steering wheel angle.

10. The control apparatus of claim 7, wherein the processor is configured to run a program corresponding to the executable program codes by reading the executable program codes stored in the memory, to:

correct the current steering wheel angle, by using a first formula, based on the first correction deviation coefficient and the second correction deviation coefficient obtained in the previous cycle to generate the corrected steering wheel angle, wherein the first formula is expressed by:

$$\delta_{real2}=(\delta_{real1}-\text{bias}_{n-1})/\text{slope}_{n-1};$$

where $\delta_{real1}$ is the current steering wheel angle, $\delta_{real2}$ is the corrected steering wheel angle, slope$_{n-1}$ is the first correction deviation coefficient of the previous cycle, bias$_{n-1}$ is the second correction deviation coefficient of the previous cycle, and n−1 represents the previous cycle.

11. The control apparatus of claim 7, wherein the processor is configured to run a program corresponding to the executable program codes by reading the executable program codes stored in the memory, to:

correct the target steering wheel angle, by using a second formula, based on the first correction deviation coefficient and the second correction deviation coefficient of the current cycle to obtain the corrected target steering wheel angle, wherein second formula is expressed by:

$$\delta_{cmd2}(\delta_{cmd1}+\text{bias})\times\text{slope};$$

where $\delta_{cmd1}$ is the target steering wheel angle, $\delta_{cmd2}$ is the target steering wheel angle obtained after the correction processing, slope is the first correction deviation coefficient of the current cycle, bias is the second correction deviation coefficient of the current cycle, and n represents the current cycle.

12. The control apparatus of claim 7, wherein the first correction deviation coefficient is expressed by:

$$\text{slope}=I_{slope}(\dot{\varphi}_{real})*\int(\dot{\varphi}_{est}-\dot{\varphi}_{real})dt; \text{ and}$$

the second correction deviation coefficient is expressed by:

$$\text{bias}=I_{bias}*(\dot{\varphi}_{real})*\int(\dot{\varphi}_{est}-\dot{\varphi}_{real})dt,$$

where $\dot{\varphi}_{est}$ represents the estimated yaw rate, $\dot{\varphi}_{real}$ represents the current yaw rate, $I_{slope}(\dot{\varphi}_{real})$ represents that $I_{slope}$ is a function of $\dot{\varphi}_{real}$ and $I_{bias}(\dot{\varphi}_{real})$ represents that $I_{bias}$ is a function of $\dot{\varphi}_{real}$.

13. A non-transitory computer readable storage medium having stored thereon a computer program that, when executed by a processor, causes the processor to implement a control method for an autonomous vehicle, the control method comprising:

obtaining a current steering wheel angle, a current vehicle speed and a current yaw rate of the autonomous vehicle;

correcting the current steering wheel angle based on a first correction deviation coefficient and a second correction deviation coefficient obtained in a previous cycle to generate a corrected steering wheel angle;

inputting the corrected steering wheel angle and the current vehicle speed into a preset vehicle dynamic model to obtain an estimated yaw rate;

obtaining a first yaw rate deviation value between the current yaw rate and the estimated yaw rate;

processing the first yaw rate deviation value by a preset closed-loop algorithm to obtain a first correction deviation coefficient and a second correction deviation coefficient of a current cycle; and performing correction processing on a target steering wheel angle based on the first correction deviation coefficient and the second correction deviation coefficient of the current cycle to obtain a corrected target steering wheel angle, and controlling the autonomous vehicle to drive based on the corrected target steering wheel angle.

14. The non-transitory computer readable storage medium of claim 13, wherein the control method further comprising:
selecting a desired yaw rate based on a scenario; and
generating the target steering wheel angle based on the desired yaw rate and the current yaw rate.

15. The non-transitory computer readable storage medium of claim 14, wherein generating the target steering wheel angle based on the desired yaw rate and the current yaw rate comprises:
transforming the desired yaw rate by a preset reference model to generate a reference yaw rate;
obtaining a second yaw rate deviation value between the current yaw rate and the reference yaw rate;
performing correction processing on the desired yaw rate based on a preset model reference adaptive algorithm and the second yaw rate deviation value to obtain a target desired yaw rate; and
inputting the target desired yaw rate into a vehicle dynamic inverse model to obtain the target steering wheel angle.

16. The non-transitory computer readable storage medium of claim 13, wherein correcting the current steering wheel angle based on the first correction deviation coefficient and the second correction deviation coefficient obtained in the previous cycle to generate the corrected steering wheel angle comprises:
correcting the current steering wheel angle, by using a first formula, based on the first correction deviation coefficient and the second correction deviation coefficient obtained in the previous cycle to generate the corrected steering wheel angle, wherein the first formula is expressed by:

$$\delta_{real2} = (\delta_{real1} - \text{bias}_{n-1})/\text{slope}_{n-1};$$

where $\delta_{real1}$ is the current steering wheel angle, $\delta_{real2}$ is the corrected steering wheel angle, $\text{slope}_{n-1}$ is the first correction deviation coefficient of the previous cycle, $\text{bias}_{n-1}$ is the second correction deviation coefficient of the previous cycle, and n−1 represents the previous cycle.

17. The non-transitory computer readable storage medium of claim 13, wherein performing the correction processing on the target steering wheel angle based on the first correction deviation coefficient and the second correction deviation coefficient of the current cycle comprises:
correcting the target steering wheel angle, by using a second formula, based on the first correction deviation coefficient and the second correction deviation coefficient of the current cycle to obtain the corrected target steering wheel angle, wherein second formula is expressed by:

$$\delta_{cmd2}(\delta_{cmd1} + \text{bias}_n) \times \text{slope}_n;$$

where $\delta_{cmd1}$ is the target steering wheel angle, $\delta_{cmd2}$ is the corrected target steering wheel angle, $\text{slope}_n$ is the first correction deviation coefficient of the current cycle, $\text{bias}_n$ is the second correction deviation coefficient of the current cycle, and n represents the current cycle.

18. The non-transitory computer readable storage medium of claim 13, wherein the first correction deviation coefficient is expressed by:

$$I_{slope} = I_{slope}(\dot{\varphi}_{real}) * \int (\dot{\varphi}_{est} - \dot{\varphi}_{real}) dt; \text{ and}$$

the second correction deviation coefficient is expressed by:

$$\text{bias} = I_{bias}(\dot{\varphi}_{real}) * \int (\dot{\varphi}_{est} - \dot{\varphi}_{real}) dt,$$

where $\dot{\varphi}_{est}$ represents the estimated yaw rate, $\dot{\varphi}_{real}$ represents the current yaw rate, $I_{slope}(\dot{\varphi}_{real})$ represents that $I_{slope}$ is a function of $\dot{\varphi}_{real}$, and $I_{bias}(\dot{\varphi}_{real})$ represents that $I_{bias}$ is a function of $\dot{\varphi}_{real}$.

* * * * *